March 14, 1961 F. GERCKE ET AL 2,974,361
APPARATUS FOR SHAPING PLASTIC ARTICLES
Original Filed Oct. 14, 1955 6 Sheets-Sheet 5
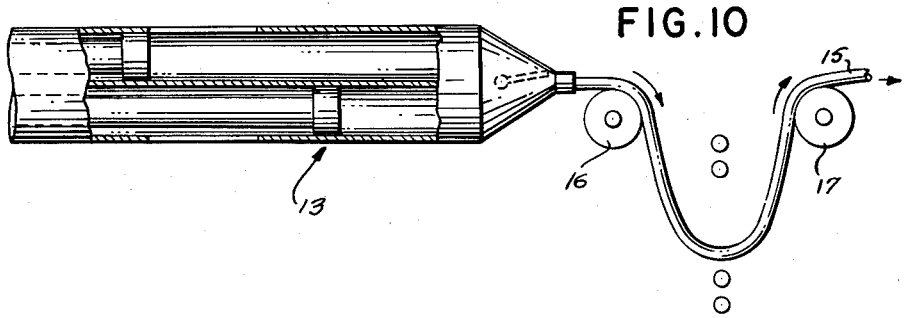
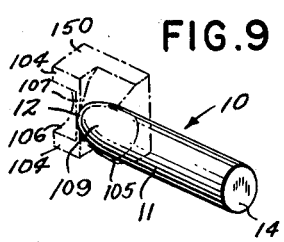
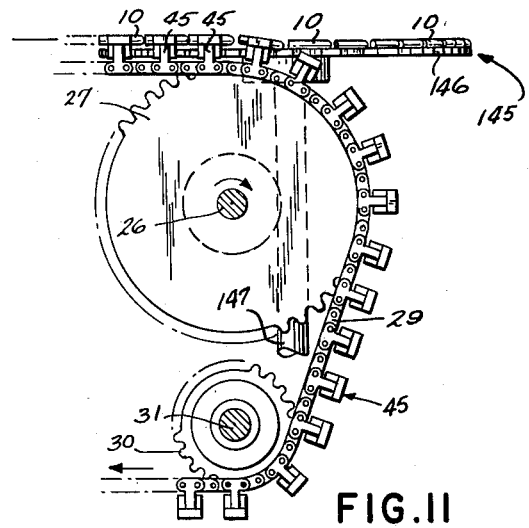
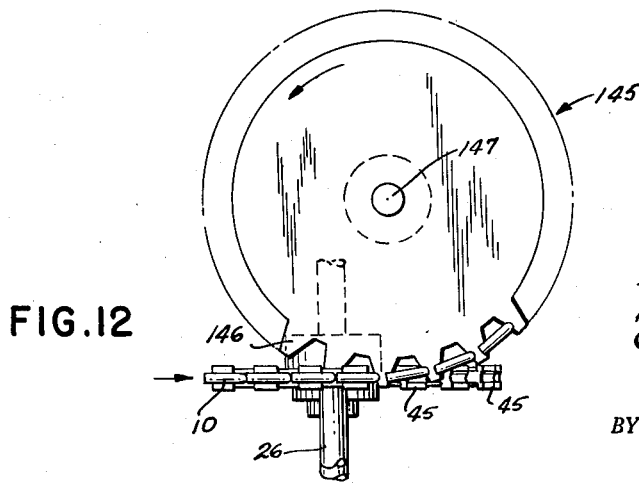
FERDINAND GERCKE
ROBERT L. HUBBARD
CARMINE FERRARA
INVENTORS
BY
Albert H. Graddis March 14, 1961 F. GERCKE ET AL 2,974,361
APPARATUS FOR SHAPING PLASTIC ARTICLES
Original Filed Oct. 14, 1955 6 Sheets-Sheet 6
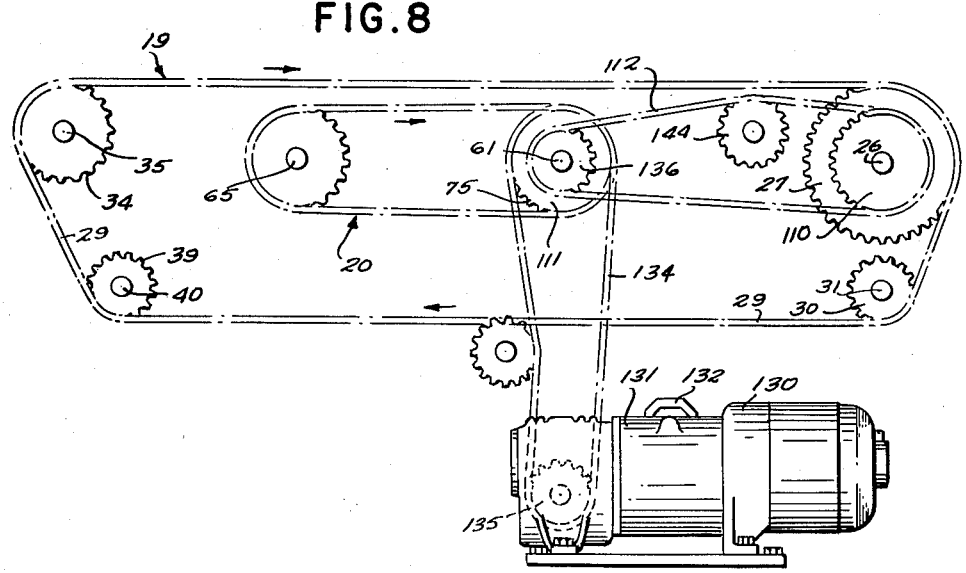
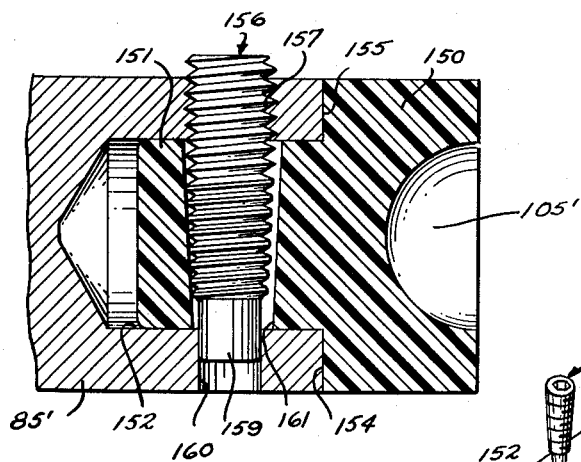
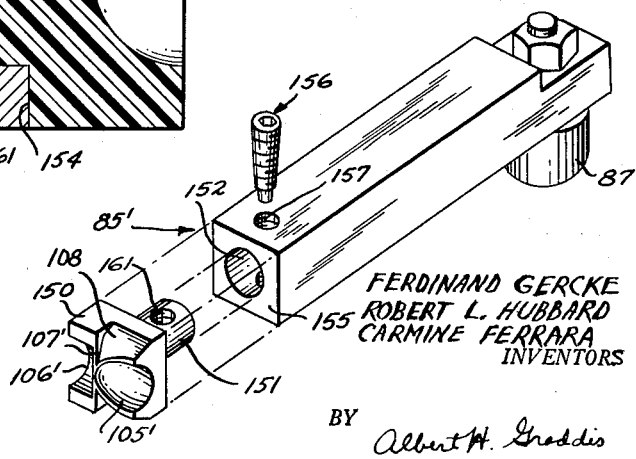
FERDINAND GERCKE
ROBERT L. HUBBARD
CARMINE FERRARA
INVENTORS
BY Albert H. Graddis United States Patent Office 2,974,361
Patented Mar. 14, 1961

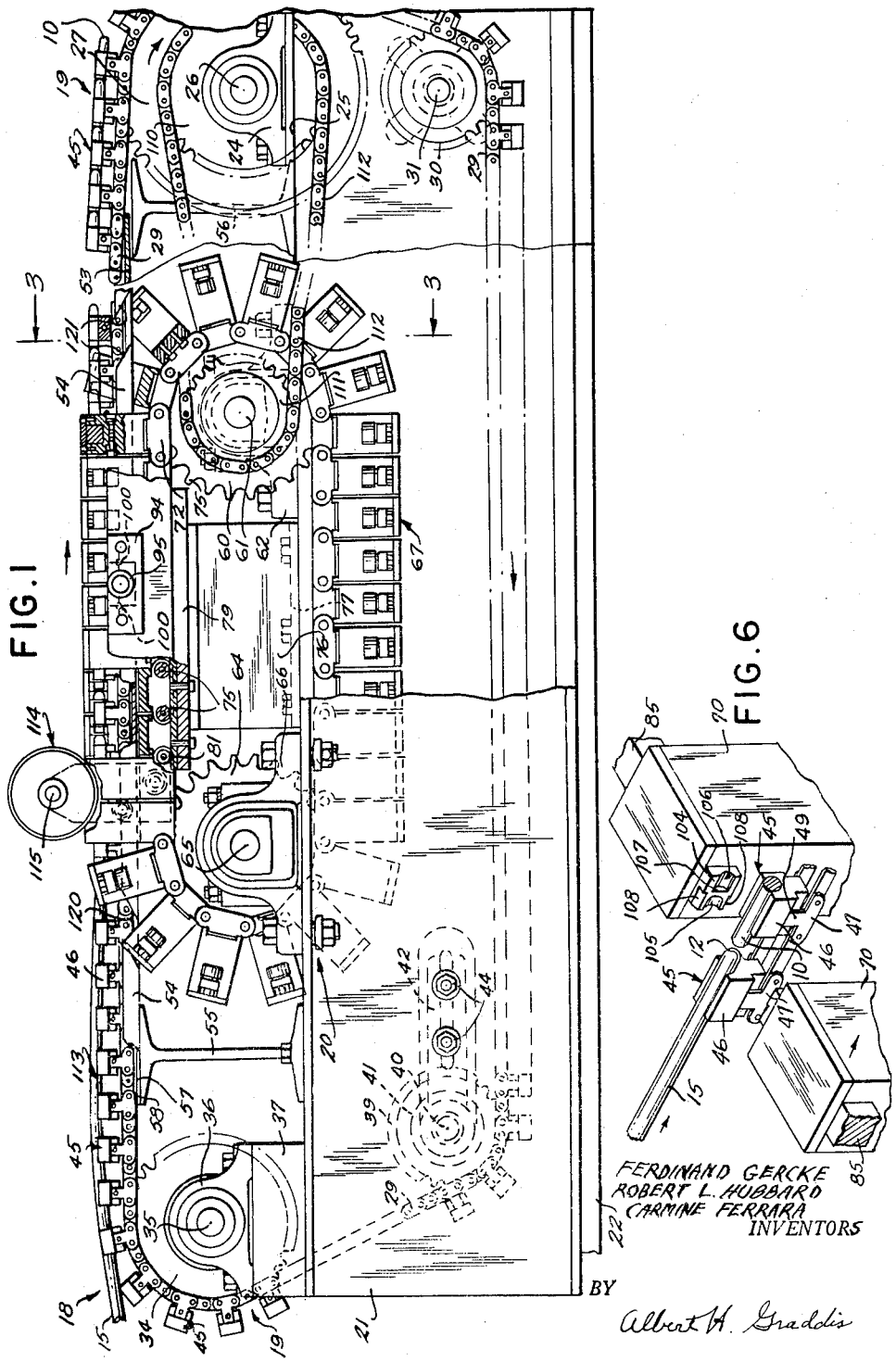

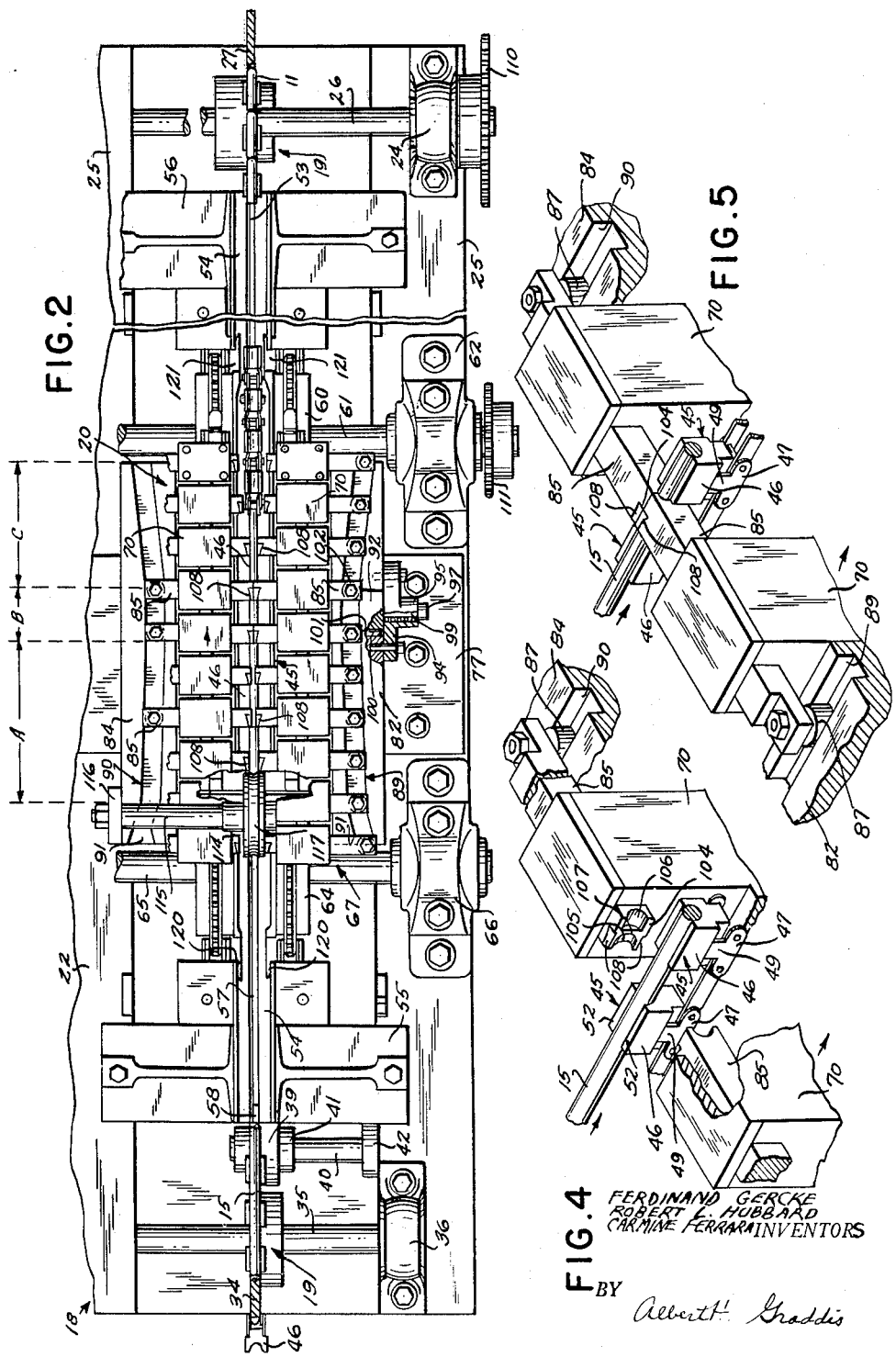

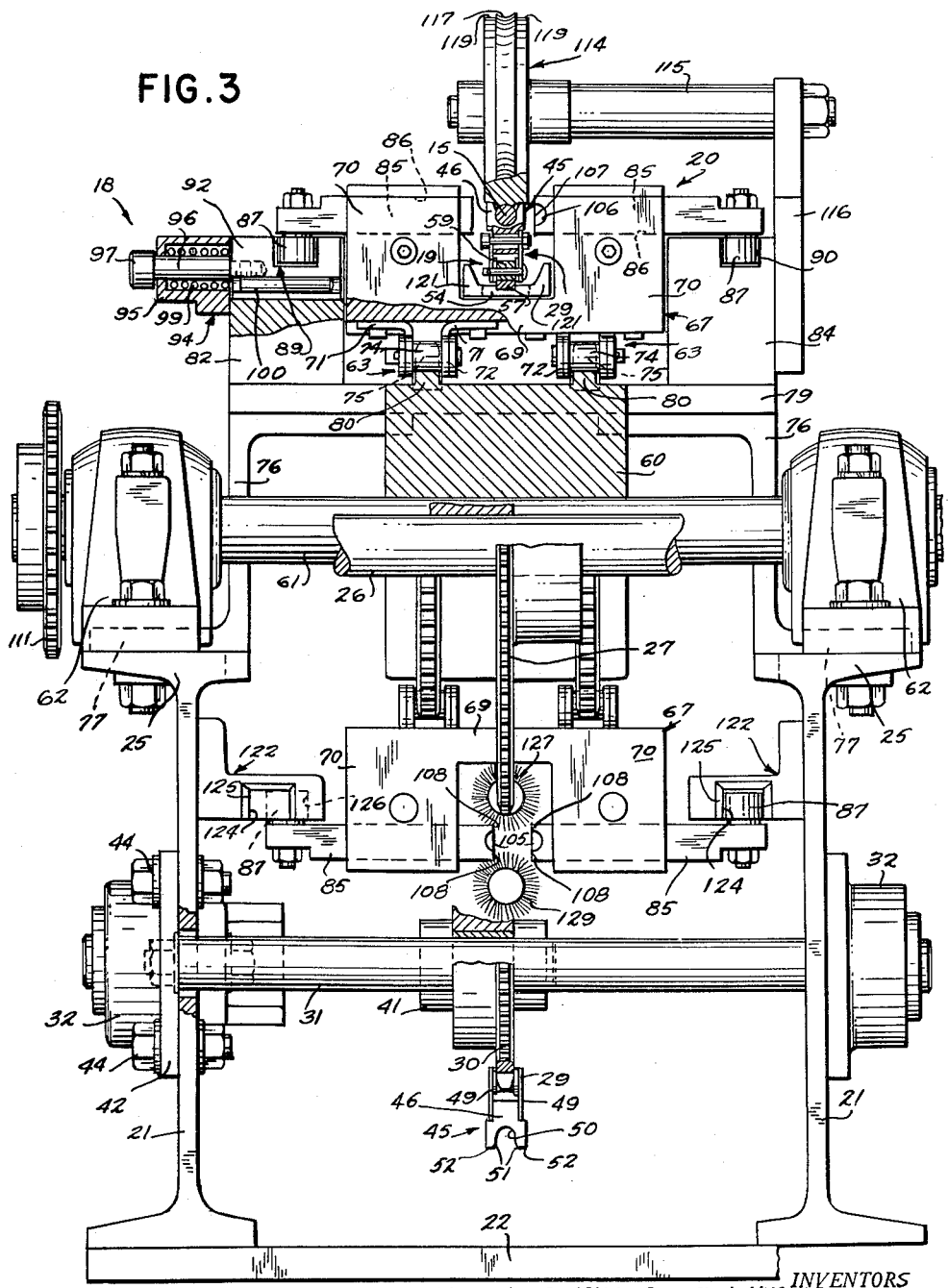

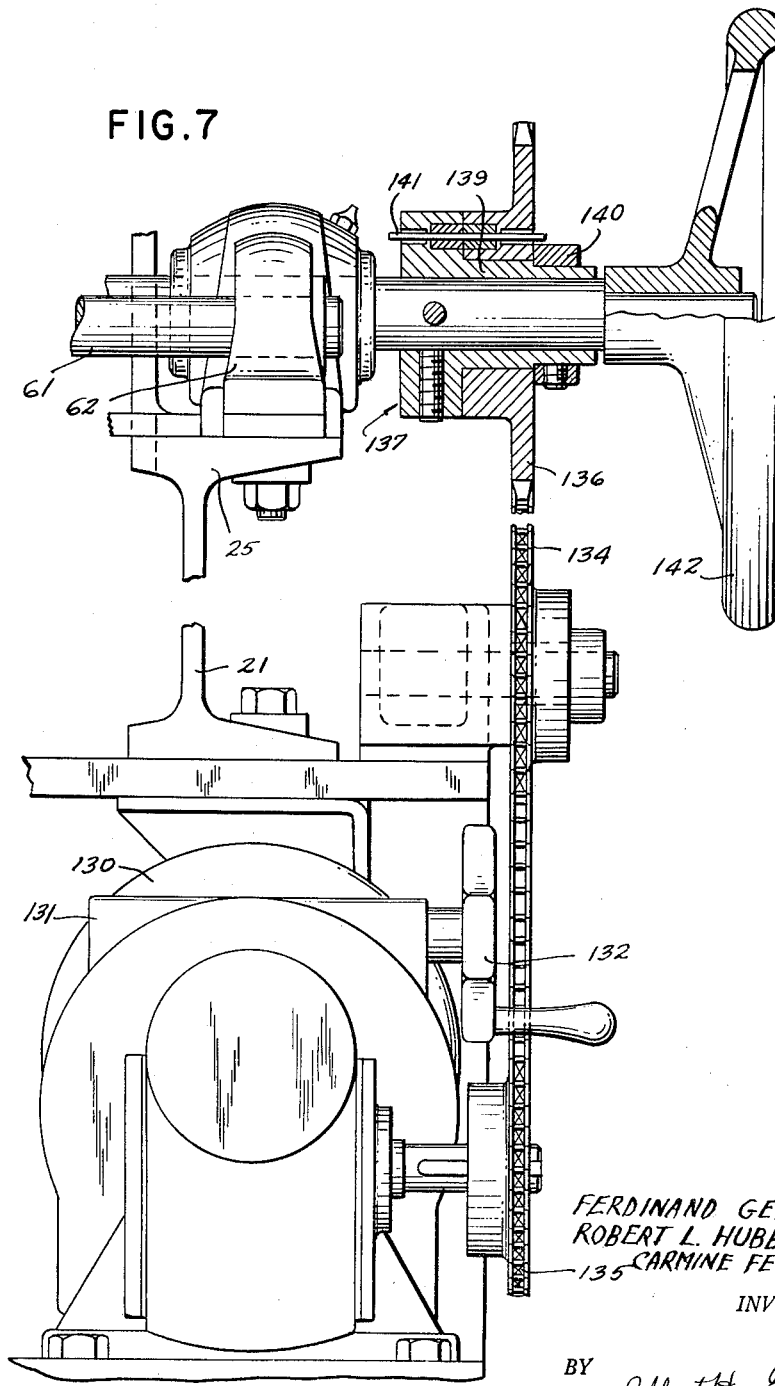

2,974,361

APPARATUS FOR SHAPING PLASTIC ARTICLES

Ferdinand Gercke, Morris Plains, and Robert L. Hubbard, Florham Park, N.J., and Carmine Ferrara, Landisville, Pa., assignors to Warner-Lambert Pharmaceutical Company, Morris Plains, N.J., a corporation of Delaware Original application Oct. 14, 1955, Ser. No. 540,433, now Patent No. 2,829,756, dated Apr. 8, 1958. Divided and this application Oct. 21, 1957, Ser. No. 691,446

16 Claims. (Cl. 18—4)

This invention relates to an apparatus for molding articles made of plastic material, and more particularly relates to the molding of a plurality of similar articles from a rod or elongated shape of moldable plastic material.

The illustrative embodiments of the apparatus of the invention produce a plurality of elongated cylindrical articles such as suppositories, in connection with the making of which the invention will be particularly described. It is to be understood, however, that the apparatus and method of the invention may be used to advantage in the forming of other articles such as lipsticks, lubricating "sticks," and the like from suitable moldable plastic material.

The plastic material from which suppositories are usually made consists largely of cocoa butter. Such material is difficult to handle and mold because it is relatively weak, and is greasy and slippery at room temperature. The material tends to stick to conveying and molding equipment, so that formerly it was customary to make suppositories by melting the plastic material and casting it into a plurality of suppository-forming mold cavities. Such prior method is slow and expensive, involving much hand labor in pouring the molten plastic material, removing the solidified cast articles from the molds, and preparing the molds for the next casting operation. Considerable delay in awaiting the solidification of the articles before their removal from the molds is inevitable. The required equipment for such method, particularly the molds and the melting pot, occupies a considerable amount of space.

The present invention provides a machines for continuously forming a plurality of elongated articles from moldable plastic material by cutting a rod of such material at spaced zones therealong and shaping the nose of each such article and the confronting tail of the next adjacent article. In a preferred embodiment of the invention, the rod of plastic material is formed by extrusion, and is fed directly into the shaping, i.e., cutting and nose and tail shaping, apparatus, although it will be understood that the rod may be preformed in separate mechanism at another location by extrusion or in other manners, if desired, and may be fed later to the shaping apparatus. In the apparatus shown, there is provided a plurality of spaced means for transversely cutting the rod, means to advance the rod and the cutting means relatively transversely or laterally toward each other, and means associated with each cutting means to shape the nose of each article and the confronting tail of the next adjacent article. Preferably, as shown, the rod is advanced by a rod-supporting and conveying mechanism comprising a plurality of interconnected spaced rod supports movable in a straight-line operative path in synchronism with the rod, and there are a plurality of progressively operating cutting and shaping means which also travel with the rod and act upon the rod in the zones between those at which the rod is engaged by the rod supports. The rod-supporting and conveying mechanism is driven to travel in synchronism with the travel of the rod shaping means. The main extent of the length of the rod is supported and guided by the rod supports, and is not acted upon by the shaping means, which functions to form only the noses and the tails of the articles. After the cutting of the rod and the shaping of the noses and tails of the resulting articles, such articles are automatically discharged from the apparatus, and are then ready for packaging.

The invention has among its objects the provision of novel, faster and more efficient apparatus for forming a plurality of articles from moldable plastic material, and particularly for forming a plurality of similar elongated generally cylindrical articles. A further object of the invention resides in the provision of apparatus for forming plastic articles from a rod of moldable plastic material by progressive cutting and shaping operations performed on spaced zones thereof as the rod travels continuously in the direction of its length. Yet another object of the invention lies in the provision of the combination of cutting and shaping mechanism of the above indicated type with mechanism for extruding the rod and feeding it to the cutting and shaping mechanism.

Other objects of the invention lie in the provision of apparatus for forming elongated plastic articles by transversely cutting a rod of moldable plastic material at spaced zones therealong and by molding the nose of each such article and the confronting tail of the next adjacent article, the provision in such apparatus of a plurality of interconnected rod supporting members which lie and travel between adjacent rod cutting and shaping means, the provision of improved rod-cutting and shaping apparatus wherein the rod-supporting members are supported and moved by a first driven endless conveyor and the rod-cutting and shaping means are supported and moved by a second endless conveyor connected to travel in synchronism with the first conveyor, and the provision of mechanism to straighten and guide the rod onto the rod supporting members on the first conveyor.

The above and further objects of the invention, including economies of use and manufacture, will appear upon consideration of the following description of preferred embodiments of the apparatus and method in accordance therewith illustrated in the accompanying drawings, in which:

Fig. 1 is a fragmentary side elevation of a preferred embodiment of the apparatus, certain portions of the apparatus being shown in longitudinal vertical section, the apparatus being broken through and shortened at the irregular broken line at the right for economy of space.

Fig. 2 (Sheet 2) is a fragmentary plan of the apparatus of Fig. 1, the apparatus being broken through along the broken line at the right thereof in generally the same location as in Fig. 1, certain of the shaft supporting bearings, parts of the rod-and-article supporting conveyor, and parts of the driving mechanism being omitted.

Fig. 3 (Sheet 3) is a fragmentary end elevation of the apparatus taken from the right in Figs. 1 and 2, certain parts of the apparatus being shown in vertical section, the section being taken generally along the line 3—3 of Fig. 1, the figure showing molding plunger cleaning mechanism not illustrated in Figs. 1 and 2, which may be employed in the apparatus.

Fig. 4 (Sheet 2) is a fragmentary isometric perspective of one device for molding the nose of an article and the confronting tail of the next adjacent article, the plungers of such device being shown retracted from the plastic rod, before the start of their rod-cutting and shaping operation.

Fig. 5 (Sheet 2) is a view similar to Fig. 4, but with the plungers of the device fully closed upon the rod.

Fig. 6 (Sheet 1) is a view similar to Figs. 4 and 5, but with the plungers of the device retracted after the completion of the rod-cutting and shaping operation.

Fig. 7 (Sheet 4) is a fragmentary end elevation, on an enlarged scale, of the driving mechanism for the apparatus.

Fig. 8 (Sheet 6) is a schematic view in side elevation of the two conveyors of the apparatus, the mechanism for drivingly interconnecting the conveyors, and the driving mechanism for the apparatus.

Fig. 9 (Sheet 5) is a view in isometric perspective of a suppository formed by the illustrated apparatus, the end of one molding plunger being shown in phantom lines in conjunction therewith.

Fig. 10 (Sheet 5) is a fragmentary schematic view, partly in side elevation and partly in vertical section, of a rod-extruding and feeding mechanism which may be employed to produce the rod of plastic material which is acted upon by the molding apparatus of the invention.

Fig. 11 (Sheet 5) is a fragmentary view in side elevation of the discharge end of the molding apparatus showing a transfer device which may be employed to remove the molded and shaped articles from the rod-and-article conveyor of the apparatus.

Fig. 12 (Sheet 5) is a fragmentary view in plan of the portion of the apparatus shown in Fig. 11.

Fig. 13 (Sheet 6) is an exploded view in isometric perspective of a modified molding and cutting plunger for use in the apparatus.

Fig. 14 (Sheet 5) is a vertical axial section through the molding head of the modified plunger of Fig. 13, the plunger being shown in a partially assembled condition.

As above indicated, the apparatus of the invention may be employed, with appropriate changes in mold shapes, etc., to form a variety of different articles. The suppository 10, which is particularly shown in Fig. 9, formed by the illustrative embodiment of the apparatus is merely typical of articles which may advantageously be formed by the apparatus. Suppository 10 has an elongated circular cylindrical main body 11, a rounded nose 12 merging smoothly with body 11, and a generally transverse trailing or tail surface 14.

The apparatus of the invention includes mechanism for progressively cutting and shaping at spaced zones a rod of moldable plastic material fed thereto and conveyed therethrough in a generally straight-line path in the direction of the length of the rod. The plastic rod, designated 15, is preferably formed by being extruded, and in Fig. 10 is extruded by a double-barreled extruding device schematically shown at 13, which forwards the rod over a first idle guide wheel 16, into a free hanging supply loop, and from the loop up over the second idle guide wheel 17 to the rod-cutting and shaping apparatus generally designated 18, shown more particularly in Figs. 1–8.

Briefly, the device 18 includes a first driven endless conveyor, generally designated 19, which extends horizontally in an upper, operative run travelling from left to right, and a lower, return run. See Fig. 8. The conveyor 19, to be described more fully hereinafter, supports a plurality of spaced rod-supporting members 46 which accurately position the rod for the cutting and shaping operations performed thereon, and eventually support and convey out of the machine the individual finally shaped articles cut from the rod. A second, shorter driven endless conveyor 20, having a horizontal upper, operative run travelling in the same direction and at the same speed as the upper run of the first conveyor 19, and a lower return run, carries a plurality of pairs of opposed supports 70 bearing opposed rod-cutting and shaping plungers 85 located to engage the rod at zones lying between the spaced rod-supporting members on the first conveyor. The plungers are operated by relatively fixed cam tracks 89 and 90 as they travel with the second conveyor, whereby the plungers are gradually urged toward each other into substantial or actual contact at a zone intermediate the ends of the operative runs of the two conveyors. The plungers are subsequently retracted by the cam tracks to clear the severed shaped articles, and are then, with their supports 70, carried downwardly clear of the first conveyor 19 by the sprocket mounting the second conveyor 20 at the exit end thereof. The first conveyor 19 continues markedly beyond the exit end of the second conveyor, carrying the shaped articles to discharge them remote from the rod-severing and shaping zone. The confronting ends of the plungers 85, as well as carrying opposed rod-cutting edges, also have rod shaping cavities adjacent such edges, whereby to shape or mold the nose of each such article and the confronting tail or trailing end of the next adjacent article.

Proceeding now to a detailed description of the mechanism 18: Such mechanism has a main frame formed of the vertical parallel longitudinally extending I beams 21 which are attached to the horizontal base plate 22. Opposed pillow blocks 24 (one shown), secured to the upper horizontal flange 25 of each beam 21, support the shaft 26 which has keyed thereto the sprocket 27 which carries the rear or discharge end of the endless chain 29 of the first conveyor 19. As shown in Fig. 1, the chain 29 runs downwardly from sprocket 27 around the idler sprocket 30, which is supported on shaft 31 rotatably mounted in bearings 32 affixed to the respective I beams 21. The chain 29 then proceeds to the left (Figs. 1 and 2) in a lower horizontal run generally toward the sprocket 34 affixed to shaft 35. Shaft 35 is rotatably mounted in pillow blocks 36 (one shown) which are supported on blocks 37 interposed between the pillow blocks 36 and the top flanges 25 of the I beams 21. The center of shaft 35 lies somewhat above that of shaft 26, the diameters of sprockets 34 and 27 being such that the top run of the chain 29 would tend to run downwardly in its travel between sprockets from left to right were it not supported in the operative, rod-cutting and shaping portion of its upper run by the horizontal track member 54, to be described.

To maintain the chain 29 taut during its travel there is provided the adjustable idler sprocket 39 at the lower portion of the left or entering end of the mechanism. Sprocket 39 is carried on the bearing 41 on the end of the non-rotatable shaft 40. Such shaft extends from the slotted plate 42 which is mounted on the left-hand I beam 21 in Fig. 3 by the bolts 44 so that it may be adjusted horizontally to tighten or loosen chain 29.

The chain 29 carries on alternate links 47 thereof (See Figs. 4, 5, and 6) rod-supporting members generally designated 45. As pointed out above, the material from which rod 15 is made tends to adhere to ordinary materials such as metals. It has been found that such sticking of the rod to members 45, and the consequent build-up of plastic material on the members and the deformation of the rod thereby, are avoided when the rod engaging portions of such members 45 are made from a polymerized tetrafluoroethylene resin sold under the trademark "Teflon." Conveniently, members 45 are formed by upstanding fingers 49 on links 47, the fingers supporting between them a cradle-like block 46 of "Teflon." Each block 46 is provided with a longitudinally extending central rod-supporting groove on its outer face, such groove having a longitudinally extending main, generally semi-circular cylindrical concave surface 50 which flares outwardly on each side at 51. Beyond each edge 51 each block 46 has flat longitudinal edges 52 which lie horizontal in the upper, operative run of conveyor 19. In such run the grooves in blocks 46 lie in a straight horizontal path and, because the blocks 46 are of appreciable length, the grooves support the plastic rod 15 accurately and stably, with little or no tendency of the rod to sag between supporting blocks, during the cutting and shaping operations, to be described, carried out on the rod between the blocks 46.

To insure that the supporting blocks 46 will travel in an accurate straight-line horizontal path in the rod-cutting and shaping portion of the upper run of conveyor 19, there is provided the above-mentioned track member 54 which supports the upper run of the conveyor 19 throughout its travel through the rod-cutting and shaping zone of the mechanism 18. Member 54 is an upwardly facing channel, as best shown in Fig. 3, and is supported at the entrance end of the device by the generally triangular support 55, the lower end of which spans between and is affixed to the upper flanges 25 of beams 21. The discharge end of the member 54 is supported by the similar triangular support 56. Member 54 has a central, longitudinally extending raised inserted track member 57 upon which the rollers 59 of chain 29 travel. The entering end of track insert member 57 is tapered, as shown at 58 in Fig. 1, whereby the rollers 59 enter upon the insert without mechanical shock. The exit end of member 57, shown at 53 in Figs. 1 and 2 is also tapered. The above-described relationship between the sprockets 27 and 34 is such that the rollers 59 are firmly pressed downwardly, by the tension in the upper run of chain 29, upon the track insert 57 from the entering to the discharge end thereof, thereby insuring that the rod-supporting blocks 46 travel smoothly and without vibration or chatter thereover in a straight horizontal line.

The second conveyor 20 has two parallel similar chains 63 (Fig. 3) which run over the double sprocket 60 at the discharge end of the device and over the double sprocket 64 at the entrance end of the device. The conveyor 20 is markedly shorter than conveyor 19, lying with its entrance and exit ends inwardly of the corresponding ends of conveyor 19, as shown. The conveyors are so related that in the upper, operative run of conveyor 20 the rod-severing and shaping plungers carried thereby travel in straight horizontal paths parallel to the rod 15 and at the same level as the rod, as shown in Fig. 3.

The sprocket 60 is keyed to shaft 61, which is rotatably mounted in opposed pillow blocks 62 on frame members 21. The sprocket 64 is carried by shaft 65, rotatably mounted in opposed pillow blocks 66 (one shown) on frame members 21. The chains 63 are formed by links 72 which interconnect the closely spaced C-shaped blocks 67. The upstanding parallel side legs 70 of each block 67 carry opposed rod-cutting and forming plungers 85. As clear in Fig. 3, the base 69 of each block 67 has spaced pairs of opposed L-shaped brackets 71 affixed thereto. The vertical legs of each pair of brackets 71 carry a roller 74 therebetween; links 72 connect the pintle pins of successive rollers. The teeth 75 of each of sprockets 60 and 64 fit between the connecting links 72 (Fig. 3).

Centrally between sprockets 60 and 64 are located the opposed Z-shaped bracket members 76, the horizontal lower flange 77 of each of which rests upon and is affixed to the upper flange 25 of its respective side beam 21. An upper horizontal plate 79 is affixed to the upper horizontal flanges of members 76 (Figs. 1 and 3). Lying beneath each chain 63 is a longitudinally extending track member 80, inserted in plate 79, upon which the rollers 75 of chains 63 travel. The entering and exit ends of track members 80 are tapered, to avoid mechanical shock and vibration of conveyor 20 as the latter travels thereover. Such entering ends of members 80 are shown at 81. (Fig. 1). Track members 80 insure the accurate travel of the upper, operative run of conveyor 20 in a straight horizontal path parallel to that of conveyor 19.

The plate 79 also serves as the support for the longitudinally extending side blocks 82 and 84, which contain cam tracks, to be described, for operating the opposed rod-cutting and shaping plungers 85. Such plungers are of square cross-section, and are accurately slidingly received in the horizontal, transversely extending passages 86 in the respective legs 70 of the blocks 67. The outer end of each plunger 85 carries beneath it a roller 87, the rollers on the plungers 85 on one side of the device being received in the cam track 89 in block 82, and those on plungers 85 on the other side of the device being received in cam track 90 in block 84.

The two cam tracks are generally mirror images of each other. Each has a flared entering end or mouth 91 at the entrance end of the upper, operative run of conveyor 20. The two cam tracks slowly converge in the zone A (Fig. 2), are parallel to each other in the zone B, and slowly diverge in the zone C. As the blocks 67, and thus the plungers 85, travel with the conveyor 19 at the same speed as the rod 15 through the zones A, B, and C the plungers are first brought gradually together by the cam tracks, then travel a short distance with their confronting ends in actual or substantial contact, and then retreat from each other to clear the articles shaped and cut from the rod by the inner, confronting ends of opposed plungers.

It is desirable that in the zone B the confronting ends of plungers 85 shall substantially or actually contact each other, to avoid the formation of "flash" at the shaped ends of the articles and to shape such ends accurately. It is not feasible to attempt to advance the plungers positively into contact with each other in such zone, because extreme accuracy of machining would be required to do so, and any subsequent inaccuracy of the parts brought about as by thermal expansion might well result in damaging or wrecking the machine. Consequently, in the machine shown the portion of the cam track 89 (Fig. 3) in zone B is made as a separate yieldable section 92 which strongly resiliently opposes movement outwardly by plungers 85 travelling therepast and which insures that the opposed plungers shall substantially or actually contact each other at such zone.

Overlying the yieldable track section 92, shown most clearly in Figs. 3 and 7, is a plate-like member 94 bolted to the outer vertical face of block 82. Member 94 has a central, outwardly projecting hooded hollow boss 95 thereon through which centrally projects the stud 96 having a head 97 overlying the hood of the boss to limit inward travel of block 92 relative to main block 82. The inner end of stud 96 is screwed into the block 92, which is free to slide a limited distance toward and away from the main extent of the opposing cam track 90. A coil compression spring 99 positioned in boss 95 surrounding stud 96 urges the block 92 inwardly. The block is accurately guided by pin-like keys 100 received in bores located partially in slidable block 92 and partially in the main block 82. It will be apparent that spring 99 will yield when necessary, to avoid building up destructive pressures between the contacting ends of plungers 85 at zone B, but will urge the slidable block 92 inwardly sufficiently strongly against the outward thrust of the plungers 85 the rollers 87 of which are mementarily engaged with block 92 to insure at least substantial contact between opposing plungers.

To insure smooth transition of the cam-track-following rollers 87 from zone A (main block 82) of the cam track to zone B (block 92) regardless of sidewise displacement of block 92, the outer wall of the entering end of the cam track in block 92 is flared at 101. The inner wall of the exit end of the cam track in block 92 is flared at 102 to insure a smooth return of rollers 87 from the track in the block 92 to the track in the main block 82.

The relationship between the conveyors 19 and 20 and the action of the confronting ends of plungers 85 in cutting the rod 15 and in shaping the nose of each resulting article and the confronting trailing end of the adjacent leading article will be clear from a consideration of Figs. 4, 5, 6 and 9. The spaced rod-supporting blocks 46 on conveyor 19 and thus the rod 15 travel in a straight horizontal path in the direction of the arrow in each of Figs. 4, 5, and 6. The C-shaped blocks 67 of conveyor 20, and thus the plungers 85 in the legs 70 of such blocks are driven in the same direction and at the same speed as rod 15 by means, to be described, drivingly interconnecting the two conveyors. The axes of the plungers of successive sets of opposed plungers are spaced from each other the same distance as the centers of the rod-supporting blocks 46, and the plungers are located so as to engage the rod 15 between successive blocks 46. In the embodiment shown, when the plungers 85 are in zone B of the machine they closely interfit between successive blocks 46 (Fig. 5).

The plungers 85 have a height somewhat exceeding the diameter of the plastic rod 15. The inner end of each plunger contains recesses forming one-half of nose and tail shaping cavities. Vertically centrally of the plungers, and at the same level as the exposed portion of the rod 15 which confronts the plunger between successive supporting blocks 46, are the longitudinally aligned generally semi-cylindrical halves 106 forming the tail shaping cavity and the halves 105 forming the nose shaping cavity. The two cavity halves 105 and 106 on each plunger are divided by a sharp-edged wall 107 which forms one of the opposed similar cutting edges on the confronting inner ends of each pair of plungers 85 of the device. The upper and lower surfaces 104 which bound the cavity half 106 are flat and lie in a vertical plane. The diameter of the tail-forming cavity 106 is little if any smaller than the diameter of the plastic rod 15, so that substantially the only shaping done in such cavity occurs at the location of the opposed cutting edges 107. The nose-forming cavity 105 varies smoothly in diameter from the rear (left, Fig. 6) end of the cavity, where it approximates the diameter of the plastic rod 15, down to substantially a point adjacent the cutting edge 107. The upper and lower edges of the cavity 105 are sharpened by bevelling their upper and lower surfaces at 108. Plastic material removed from the article by the shaping cavity portions 105 in forming the nose 12 thereof tends to gather on the bevelled surfaces 108 of the plungers, from which it is subsequently removed. One suitable means for removing such excess material is shown somewhat schematically in Fig. 3, and will be subsequently described.

The conveyors 19 and 20 of the rod-cutting and shaping device 18 are driven by a geared electric motor 130 through a variable speed drive means 131 having a speed control hand wheel 132. Variable speed driving means 131 is drivingly connected to the right-hand end of shaft 61 as it is shown in Fig. 3 by chain 134 entrained over sprocket 135 on means 131 and sprocket 136 on shaft 61. The two conveyors are connected by means of a chain 112 which is entrained over sprocket 110 on shaft 26 and sprocket 111 on shaft 61. To take up slack in the chain 112 an idler sprocket 144 (Fig. 8) is provided to engage the upper run of such chain. Such sprocket may be adjusted vertically by conventional mounting means, not shown.

To protect the device against destructive overloads such as would occur if hard foreign material should accidentally be caught between plungers 85, for example, the driving means is provided with an over load protective device, more clearly shown in Fig. 7. The sprocket 136 is rotatably mounted on a reduced-diameter portion 139 of collar 137, which is pinned to shaft 61, the sprocket being retained by collar 140. A shear pin 141, extending through the sprocket 136 and the larger diametered portion of collar 137, is of sufficient strength to drive the apparatus under all normal loads. When the driving means become overloaded, however, as by the jamming of the molding plungers as described, pin 141 will shear off, allowing the driving means to continue to run. The molding device may then be backed off by hand by use of hand wheel 142 on shaft 61, so that it may be cleared of the obstruction. After motor 130 has been stopped and a new shear pin 141 has been inserted, the apparatus will again be in operating condition.

Material from which plastic rod 15 is made is readily pliable, and once having been bent, tends to retain its set. In passing over the guide wheel 17 on its way to the cutting and shaping mechanism 18, therefore, the extruded rod 15 tends to be arched up, and thus not to lie stably in a straight line in the central grooves in the spaced supporting means 45. Such upward bend of the rod is indicated in Fig. 1 at 113. To remove this bend in the rod and to cause it to lie stably in the successive supports 45, there is provided a hold-down wheel 114 on the mechanism 18. Wheel 114, which overlies and cooperates with the upper run of the conveyor 19 at a location approximately at the beginning of the upper run of the conveyor 20, is mounted on a transverse shaft 115 for free rotation thereon. Shaft 115 projects laterally from vertical plate 116 which is bolted to the block 84 of the machine.

As shown most clearly in Fig. 3, the wheel 114 has a central, peripheral, part-circular groove 117, which is of the same diameter as the rod 15, and which engages the top of such rod. Laterally of the groove 117 in the wheel 114 there are provided two peripheral cylindrical shoulder portions 119, which are so located as to mate with the upper edge surfaces 52 of the successive rod-supporting blocks 46. As can be seen in Fig. 3, the wheel 114 and the successive rod-supporting blocks 46 present between them a closed, accurately located pass which both straightens the rod and insures its accurate feeding into the rod shaping portion of the machine. In addition, the engagement between the shoulders 119 on wheel 114 and the upper side surfaces 52 of blocks 46 prevents the deformation of the rod, at the same time pushing the upper run of conveyor 19 firmly downwardly against its guiding track 57.

After the rod-cutting and shaping plungers 85 have been retracted into the position shown in Fig. 6, the conveyor 20 carries their supporting blocks 67 gradually downwardly over the outer periphery of the sprocket 60. To allow clerance between the track-supporting member 54 for the first conveyor 19 and the inner ends of the plungers 85, opposite sides of the member 54 are cut away angularly as indicated at 121 to allow the travel of the plungers therepast. Similar cut-out sections are provided in the edges of the member 54 at the entering end of the machine, as shown at 120, to allow the retracted plungers to travel upwardly past such member 54.

In their travel down over the exit sprocket 60 and into the lower return run of the conveyor 20, the plungers 85 tend to retain the retracted position which they had at the discharge end of zone C of the cam tracks. To allow the cleaning of the excess plastic material or "flash" removed from the rod and particularly clinging to the bevelled surfaces 108 of the plungers, the mechanism may be provided with plunger-cleaning means, shown somewhat schematically in Fig. 3, and now to be described. Fixedly positioned on the side beams 21 of the machine in locations to cooperate with the lower return run of the conveyor 20 are two return cam tracks 124 which receive the rollers 87 on the outer ends of the plungers 85. Each such cam track 124 has a flared entering end 125 which smoothly leads the rollers into the main cam track. At a position inwardly of the entrance end 125 each track is provided with an inward jog, indicated at 126 at the left in Fig. 3, whereby each plunger is momentarily thrust inwardly into engagement with upper and lower longitudinally extending driven brushes 127 and 129, respectively, which may be mounted on bracket members (not shown) extending inwardly from the I beams 21. The brushes rotate about horizontal axes, and may conveniently be driven by means (not shown) drivingly connecting them with the bottom return run of a chain of conveyor 19 or 20. The bottom return of chain 29 of conveyor 19, for example, may be used to drive the brushes. The brushes are so located that they are substantially tangential to the upper and lower bevelled surfaces 108 on the inner ends of the plungers 85, so that the excess plastic material adhering to the plungers will be removed by the brushes. After the plungers have been advanced into engagement with the brushes, they are then returned to their outer position, so that when they are again presented at the upper horizontal run of the conveyor 20, they will be in position to be received within the mouth of the upper operative cam tracks 89 and 90.

The molded suppositories 10 may be manually removed from the right-hand end of conveyor 19. They may be allowed to drop a short distance from supporting members 46 as the conveyor 19 travels down over sprocket 27, or they may be automatically removed from conveyor 19 at the discharge end of the latter. Mechanism is shown in Figs. 11 and 12 for performing such last operation.

Rotatably supported on a vertical shaft 147 located somewhat beyond the axis of shaft 26 of the machine is a horizontal suppository take-off disc 145. Disc 145 has tapered teeth 146 on its periphery, such teeth protruding into the spaces between successive suppository-supporting members 45 on conveyor 19 and loosely meshing with the parts of supporting members 45 above chain 29 and below suppositories 10 so that disc 145 is driven by the conveyor in the direction shown. The space between the tips of successive teeth 146 on the disc 145 is less than the length of the suppositories. As the chain 29 runs over the top of sprocket 27 and begins to descend, supporting members 45 are gradually lowered with respect to disc 145 and finally pull free of the teeth on the disc, leaving successive suppositories lying on the disc spanning between successive teeth 146, as shown in Fig. 12. The suppositories may then readily be removed from disc 145 either manually or automatically, as by means (not shown) including a transfer device removing them from the disc at a zone spaced from conveyor 19 and a packaging device to which they are then forwarded.

In Figs. 13 and 14 there is shown a modified article cutting and molding plunger, which may be substituted in the apparatus for the above-described plungers 85. The modified plunger of Figs. 13 and 14 has a removable head or inner end 150, which may readily be removed and replaced without requiring the removal of the plunger as a whole from the machine. The forming cavities and cutting edges on head 150 which have the same configuration as those on plunger 85, are designated by the same reference characters with an added prime. Preferably the head 150 is molded of plastic material, as indicated, so that it may be molded to finished shape, thus dispensing with expensive machining of the cutting edges and molding cavities at the inner end of the plunger. It has been advantageous to make plunger head 150 of polymerized tetrafluoroethylene resin, sold under the trademark "Teflon," because the molded suppositories and the "flash" or excess plastic material cut from plastic rod 15 have little tendency to adhere to such resin.

As shown in Figs. 13 and 14, the plunger head 150 has a rearwardly projecting central cylindrical shank 151 which accurately fits within shallow central bore 152 in the inner end of the main body 85 of the plunger to position the head 150 as a prolongation of body 85'. When head 150 is fully engaged on body 85', as shown in Fig. 14, shoulder 154 on the head at the base of shank 151 engages face 155 on the inner end of the body 85'.

The head 150 is securely retained in position on body 85' by tapered stud 156 which has a smooth cylindrical lower pilot end accurately received in radial bore 160 in the lower wall of body 85' intersecting axial bore 152. Diametrically opposed to bore 160 body 85' has a threaded bore 157 which tightly receives the threaded upper end of stud 156 when the stud is advanced into the body 85' to fully assembled position, in which the top and bottom surfaces of stud 156 lie substantially flush with the upper and lower surfaces of body 85'.

The intermediate portion of stud 156 passes through diametrical hole 161 in shank 151 of head 150. The axis of hole 161, as it is shown in Fig. 14, is vertical, and the hole converges from top to bottom at an angle which is at least generally the same as the angle of taper of the threaded portion of stud 156.

The upper and lower ends of hole 161 have diameters approximating the outer diameters of the lower end of the threaded portion and the upper end of the intermediate portion within bore 152, respectively, of stud 156. The axis of hole 161 is located slightly closer to shoulder 154 of body 150 than the distance between the common axis of holes 160 and 157 and the inner face 155 of body 85' of the plunger. Consequently, when the stud 156 is advanced into position in body 85' its rear surface strongly engages the rear surface of tapered hole 161 in shank 151, pulling the head 150 strongly to the left (Fig. 14). The shank 151 is thus held under considerable tension, and, being yieldable to at least a slight extent, constantly maintains the surface 154 of the head tightly in engagement with shoulder 155. When necessary, head 150 may be easily removed and re-installed, without damage to the head or the plunger body.

Whereas for purposes of illustration we have shown and described preferred embodiments of an apparatus for and a method of shaping plastic articles, it will be understood that the invention is not limited thereto, since both the apparatus and the method are capable of numerous variations as to details. The scope of the invention is, therefore, to be defined by the claims appended hereto.

This application is a division of our copending application S. No. 540,433 filed October 14, 1955 and now Patent 2,829,756, granted April 8, 1958.

We claim as new the following:

1. Apparatus for forming a plurality of similar elongated cylindrical articles from a cylindrical rod of moldable plastic material which comprises a plurality of aligned spaced interconnected means for supporting and feeding the travelling rod in a generaly straight path in the direction of its length, means for driving the above means, a plurality of equally spaced interconnected means each lying between successive rod supporting and feeding means for transversely cutting the rod, means for moving said last named means in synchronism with the rod supporting and feeding means along a path generally parallel to the path of feeding of the rod, means progressively to advance the cutting means in their travel traversely toward the rod, and means associated with each cutting means to mold the nose of each article and the confronting tail of the next adjacent article during the lateral advance of the cutting means.

2. Apparatus for forming a plurality of similar elongated cylindrical articles from a rod of moldable plastic material which comprises a generally aligned group of members supported and driven to travel forward in generally a straight path, a first set of alternate members of said group being spaced supports for stably holding said rod of plastic material and carrying it forward in a straight line in the direction of its length, the other set of alternate members of said group being spaced rod-cutting and rod-shaping members acting upon the rod in the zones thereof exposed between rod supports, and means for moving said last named members progressively transversely toward the rod during said forward travel of the rod and the last named members.

3. Apparatus for forming a plurality of similar elongated cylindrical articles from moldable plastic material which comprises a plurality of aligned spaced interconnected means for stably supporting a cylindrical rod of such plastic material, means for driving such means to carry the rod forward in a path along the direction of its length, a plurality of generally aligned interconnected rod-cutting means mounted for travel in a straight line generally parallel to the path of travel of the rod and the supporting means, the rod-cutting means being spaced from each other substantially the same distance as the space between successive rod supporting means, means supporting and driving the interconnected rod supporting means and the interconnected rod-cutting means so that the latter means are spaced between the rod-supporting means in the straight line path of the rod, and means integral with each rod-cutting means and operable simultaneously therewith for molding the nose of each article as it is severed from the rod and for molding the confronting tail of the next adjacent article.

4. Apparatus for forming a plurality of similar elongated cylindrical articles from moldable plastic material which comprises a first endless conveyor carrying a plurality of aligned spaced means for stably supporting a cylindrical rod of such plastic material, means for driving such first conveyor to carry the rod forward in a path along the direction of its length, a second endless conveyor carrying a plurality of generally aligned rod-cutting means in a straight line generally parallel to the path of travel of the rod and the supporting means, the rod-cutting means being spaced from each other substantially the same distance as the space between successive rod supporting means, means for drivingly interconnecting the first and second conveyors so that the rod-cutting means are spaced between the rod-supporting means in the straight line path of the rod, and means integral with each rod-cutting means and operable simultaneously therewith for molding the nose of each article as it is severed from the rod and for molding the confronting tail of the next adjacent article.

5. Apparatus for forming a plurality of similar elongated cylindrical articles from a rod of moldable plastic material which comprises a generally aligned group of members supported and driven to travel forward in generally a straight path, a first set of alternate members of said group being spaced supports mounted on a first endless conveyor for stably holding said rod of plastic material and carrying it forward in a straight line in the direction of its length, the other set of alternate members of said group being spaced rod-cutting and rod-shaping members mounted on a second endless conveyor and acting upon the rod in the zones thereof exposed between rod supports, means for drivingly interconnecting the two conveyors, and means for moving said last named members progressively transversely toward the rod during said forward travel of the rod and the last named members.

6. Apparatus for forming a plurality of similar elongated cylindrical articles from moldable plastic material which comprises an endless conveyor system comprising means for supporting and moving a plurality of serially arranged opposed pairs of supports through an operative zone, means between the supports of each pair for supporting and conveying a rod of such plastic material for travel in the direction of its length through the operative zone, opposed plungers carrying rod deforming means on their confronting ends mounted in the respective supports, and elongated stationary cam tracks positioned along the sides of the supports and cooperating with the plungers to advance the plungers into substantial contact to deform the rod and then to retract the plungers during travel of the supports and the rod through the operative zone of the apparatus.

7. Apparatus for forming a plurality of similar elongated cylindrical articles from molded plastic material which comprises a first endless conveyor system comprising means for supporting and moving a plurality of serially arranged supports in opposed pairs through a straight line path in an operative zone, a second endless conveyor having a run extending parallel to the operative zone and positioned between the supports of each pair for supporting and conveying a rod of such plastic material for travel in the direction of its length through the operative zone, an elongated track supporting and guiding the run of the second conveyor in the operative zone, opposed plungers carrying rod deforming means on their confronting ends mounted in the respective supports, and elongated stationary cam tracks positioned along the sides of the supports and cooperating with the plungers to advance the plungers into substantial contact to deform the rod and then to retract the plungers during travel of the supports and the rod through the operative zone of the apparatus.

8. Apparatus for forming a plurality of similar elongated cylindrical articles from molded plastic material which comprises a first endless conveyor carrying a series of U-shaped supports having broad bases and outwardly projecting opposed parallel legs, the first conveyor being arranged to move said supports through a straight-line path in an operative zone, a second endless conveyor having a run extending parallel to the operative zone and positioned between the opposed legs of each support for supporting and conveying a rod of such plastic material for travel in the direction of its length through the operative zone, an elongated track lying between the opposed legs of the supports and above the base thereof for supporting and guiding the run of the second conveyor in the operative zone, means drivingly interconnecting the first and second conveyors for synchronized travel through the operative zone, opposed plungers carrying rod deforming means on their confronting ends mounted in the respective supports, and elongated stationary cam tracks positioned along the sides of the supports and cooperating with the plungers to advance the plungers into substantial contact to deform the rod and then to retract the plungers during travel of the supports and the rod through the operative zone of the apparatus.

9. Apparatus for forming a plurality of similar articles from moldable plastic material which comprises means for supporting and moving a plurality of serially arranged supports in oppsoed pairs through an operative zone, means between the supports of each pair for supporting and conveying a rod of such plastic material for travel in the direction of its length through the operative zone, opposed plungers carrying rod deforming means on their confronting ends mounted in the respective supports, and elongated stationary cam tracks positioned along the sides of the supports and cooperating with the respective plungers during travel of the supports and the rod through the operative zone of the apparatus to advance the plungers from an initial position spaced from the rod into an intermediate position, in which the plungers at least substantially contact each other, and then to retract the plungers into a final position spaced from the rod, at least one of the cam tracks having the portion thereof which advances its plunger into the intermediate position formed as a separate member outwardly yieldable under the thrust of its plunger.

10. Apparatus for forming a plurality of similar articles from moldable plastic material which comprises means for supporting and moving a plurality of serially arranged supports in opposed pairs through an operative zone, opposed plungers on said supports carrying on their confronting ends means to deform a rod of such plastic material located between the plungers, elongated stationary cam tracks cooperating with the respective plungers during travel of the supports to advance the plungers from an initial position spaced from the rod into an intermediate position, in which the plungers at least substantially contact each other, and then to retract the plungers into a final position spaced from the rod, at least one of the cam tracks having the portion thereof which advances the plunger into the intermediate position formed as a separate member, means mounting the member for limited travel generally transverse to the length of its cam track, and means constantly yieldably urging the member inwardly toward the other cam track whereby the member may yield outwardly under the thrust of its plunger.

11. Apparatus for forming a plurality of similar elongated cylindrical articles from a cylindrical rod of moldable plastic material which comprises a plurality of spaced interconnected supports for feeding the rod in a generally straight path in the direction of its length, said supports each having a longitudinally extending central rod-supporting groove in its upper surface, means travelling with the rod to deform it at the zones thereof between said supports, and means adjacent the entering end of said straight path for straightening the rod and causing it to lie stably in the grooves in the supports comprising a wheel having a central rod-fitting groove on its periphery, the wheel lying above the path of travel of the rod with its axis transverse thereto, and the groove in the periphery of the wheel contacting the upper surface of the rod and pressing the rod into the grooves on the supports.

12. Apparatus for forming a plurality of similar elongated cylindrical articles from a cylindrical rod of moldable plastic material which comprises a plurality of spaced interconnected supports for feeding the rod in a generally straight path in the direction of its length, said supports each having a longitudinally extending central rod-supporting groove in its upper surface and shoulders laterally of the groove, means travelling with the rod to deform it at the zone thereof between said supports, and means adjacent the entering end of said straight path for straightening the rod and causing it to lie stably in the grooves in the supports comprising a wheel having a central rod-fitting groove on its periphery, and peripheral shoulders on each side of the central groove, the wheel lying above the path of travel of the rod with its axis transverse thereto, the periphery of the wheel interfitting with the upper surface of each support to form a closed rod-guiding and straightening pass.

13. Apparatus for forming a plurality of similar elongated cylindrical articles from moldable plastic material which comprises means for extruding a cylindrical rod of such material, means for feeding the extruded rod from the extruding means comprising a rod-deflecting and bending guide wheel, and rod-shaping means beyond the guide wheel to which the rod is then fed, said rod-shaping means comprising a plurality of spaced interconnected supports for feeding the rod in a generally straight path in the direction of its length, said supports each having a longitudinally extending central rod-supporting groove in its upper surface, means travelling with the rod to deform it at the zones thereof between said supports, and means adjacent the entering end of said straight path for straightening the rod and causing it to lie stably in the grooves in the supports comprising a wheel having a central rod-fitting groove on its periphery, the wheel lying above the path of travel of the rod with its axis transverse thereto, and the groove in the periphery of the wheel contacting the upper surface of the rod and pressing the rod into the grooves on the supports.

14. Apparatus for forming a plurality of similar elongated cylindrical articles from a rod of moldable plastic material which comprises a generally aligned group of members supported and driven to travel forward in generally a straight path, a first set of alternate members of said group being spaced supports mounted on a first endless conveyor for stably holding said rod of plastic material and carrying it forward in a straight line in the direction of its length, the other set of alternate members of said group being spaced rod-cutting and rod-shaping members mounted on a second endless conveyor and acting upon the rod in the zones thereof exposed between rod supports, means for drivingly interconnecting the two conveyors, means for moving said last named members progressively transversely toward the rod during said forward travel of the rod and the last named members, and cleaning means located adjacent to the return path of the second conveyor to remove adherent plastic material from the rod-cutting and rod-shaping members.

15. Apparatus according to claim 14 wherein said cleaning means comprise a pair of brushes and means to rotate the brushes so as to bring the bristles thereof into contact with the molding and cutting surfaces of the rod-cutting and rod-shaping means.

16. Apparatus according to claim 15 which comprises means for momentarily forcing the rod-cutting and rod-shaping means into close contact with said brushes.

References Cited in the file of this patent

UNITED STATES PATENTS

| | | |
|---|---|---|
| 1,107,976 | McCoy | Aug. 18, 1914 |
| 1,232,297 | Hambuechen | July 3, 1917 |
| 1,400,473 | Whitney | Dec. 13, 1921 |
| 1,469,819 | Ruby | Oct. 9, 1923 |
| 1,628,333 | Schaub | May 10, 1927 |
| 1,757,562 | Fey | May 6, 1930 |
| 1,935,076 | Burns | Nov. 14, 1933 |
| 2,166,490 | Gora | July 18, 1939 |
| 2,363,051 | Dosmann | Nov. 21, 1944 |
| 2,454,192 | Maynard | Nov. 16, 1948 |
| 2,530,400 | Rado | Nov. 21, 1950 |
| 2,552,027 | Bird et al. | May 8, 1951 |
| 2,792,591 | Cardot et al. | May 21, 1957 |
| 2,829,756 | Gercke et al. | Apr. 8, 1958 |

FOREIGN PATENTS

| | | |
|---|---|---|
| 288,038 | Switzerland | Dec. 31, 1950 |